(12) United States Patent
Freitag et al.

(10) Patent No.: US 8,003,248 B2
(45) Date of Patent: Aug. 23, 2011

(54) BATTERY LID WITH INTEGRAL THICK BOSS SURROUNDING A TERMINAL HOLE

(75) Inventors: Gary Freitag, East Aurora, NY (US); Dominick Frustaci, Williamsville, NY (US); Donald Kaiser, Clarence Center, NY (US)

(73) Assignee: Greatbatch Ltd., Clarence, NY (US)

( * ) Notice: Subject to any disclaimer, the term of this patent is extended or adjusted under 35 U.S.C. 154(b) by 330 days.

(21) Appl. No.: 12/014,260

(22) Filed: Jan. 15, 2008

(65) Prior Publication Data
US 2009/0239141 A1  Sep. 24, 2009

Related U.S. Application Data

(60) Provisional application No. 60/975,611, filed on Sep. 27, 2007.

(51) Int. Cl.
*H01M 2/14* (2006.01)
*H01M 2/04* (2006.01)

(52) U.S. Cl. ......................... 429/175; 429/176

(58) Field of Classification Search .......... 429/175–176
See application file for complete search history.

(56) References Cited

U.S. PATENT DOCUMENTS

| | | |
|---|---|---|
| 3,161,548 A | 12/1964 | Goldingay |
| 4,433,361 A | 2/1984 | Wolf et al. |
| 4,724,190 A * | 2/1988 | Siga et al. ............. 429/158 |
| 5,173,375 A | 12/1992 | Cretzmeyer et al. |
| 5,750,286 A | 5/1998 | Paulot et al. |
| 5,811,206 A | 9/1998 | Sunderland et al. |
| 5,926,362 A | 7/1999 | Muffoletto et al. |
| 6,010,803 A | 1/2000 | Heller, Jr. et al. |
| 6,300,004 B1 | 10/2001 | Tucholski |
| 6,334,879 B1 | 1/2002 | Muffoletto et al. |
| 6,562,508 B1 | 5/2003 | Satoh et al. |
| 6,746,798 B1 | 6/2004 | Hiratsuka et al. |
| 6,960,408 B1 * | 11/2005 | Suzuki ................. 429/180 |
| 6,986,796 B2 | 1/2006 | Warchocki et al. |
| 2002/0136943 A1 | 9/2002 | Warchocki et al. |
| 2004/0023109 A1 | 2/2004 | Rusin et al. |
| 2004/0137319 A1 | 7/2004 | Warchocki et al. |
| 2004/0161666 A1 | 8/2004 | Haas et al. |

FOREIGN PATENT DOCUMENTS

DE   102007005847 A1   8/2007

OTHER PUBLICATIONS

European Search Report, Jan. 21, 2009.

* cited by examiner

*Primary Examiner* — Patrick Ryan
*Assistant Examiner* — Ladan Mohaddes
(74) *Attorney, Agent, or Firm* — Michael F. Scalise

(57) ABSTRACT

An improved lid for closing the open end of a casing of an electrochemical energy storage device is described. The improved lid comprises a flat region having spaced apart upper and lower planar surfaces joined by a peripheral edge, an angled transition forming a boss protruding from the lower surface, and a bore extending through the boss to the upper surface. An electrical energy storage device is also described, which includes the improved lid secured to the open end of the casing container of the device.

10 Claims, 9 Drawing Sheets

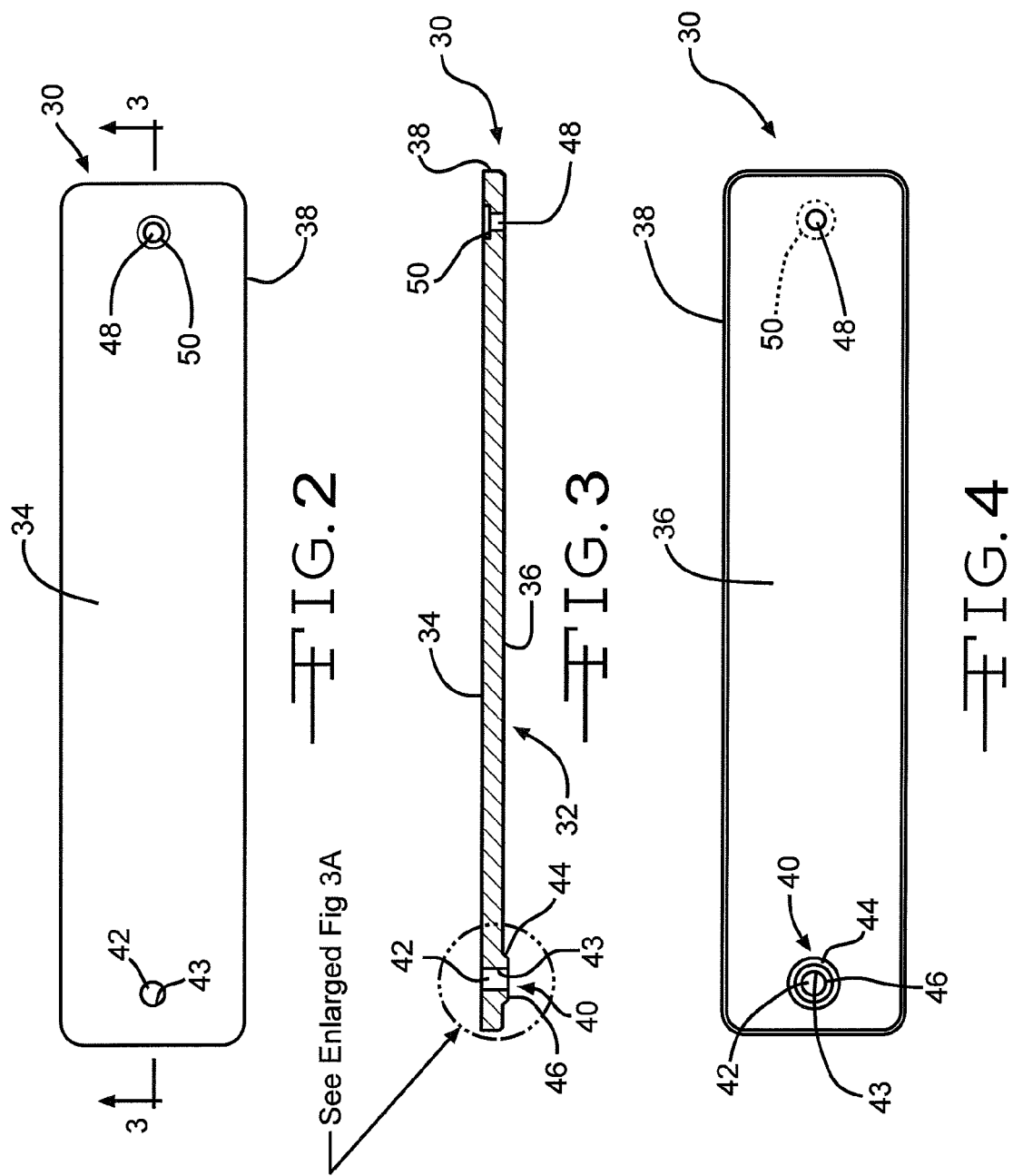

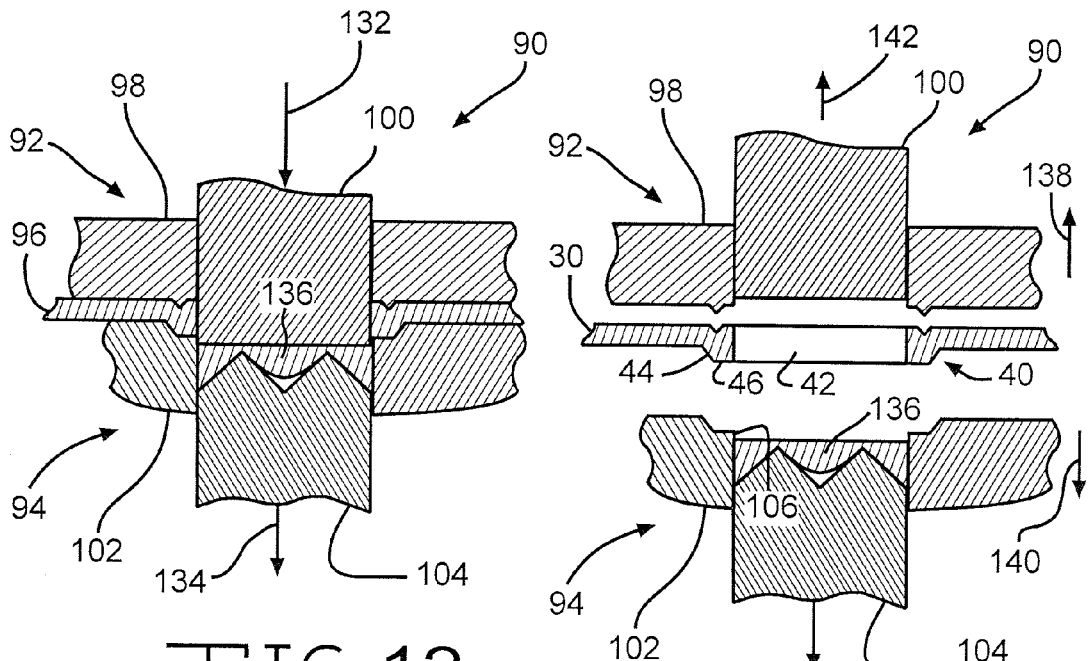
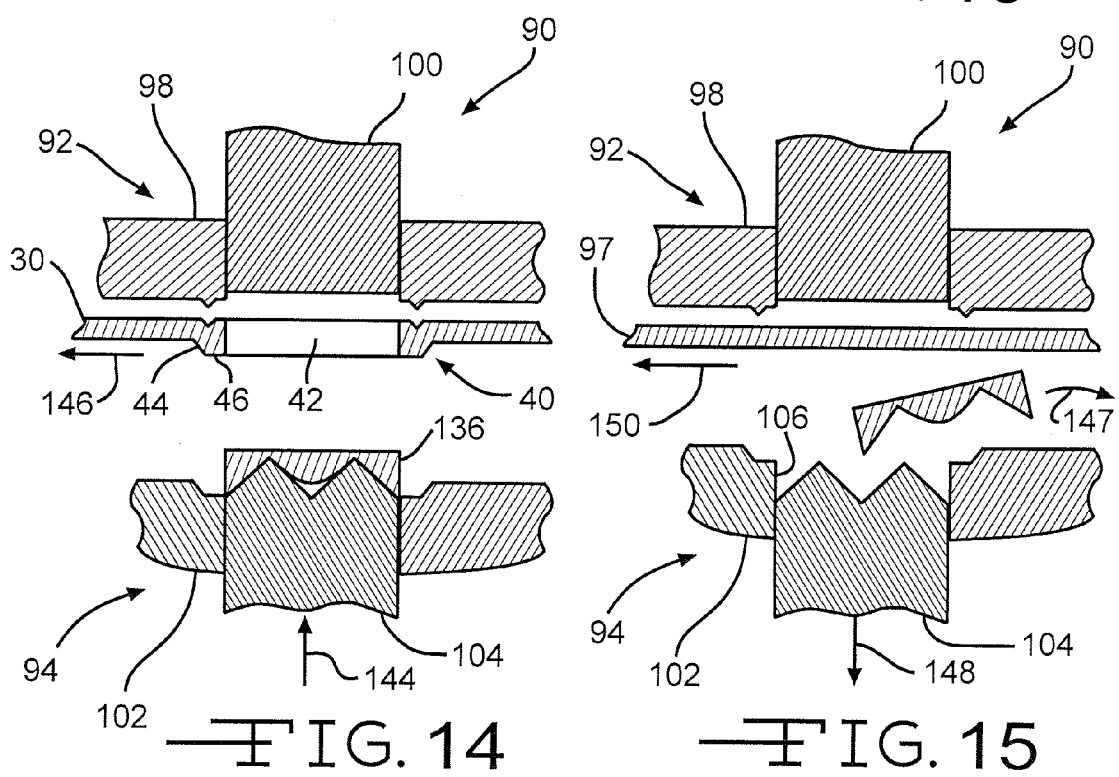

BATTERY LID WITH INTEGRAL THICK BOSS SURROUNDING A TERMINAL HOLE

CROSS-REFERENCE TO RELATED APPLICATION

This application claims priority from U.S. Provisional Application Ser. No. 60/975,611 filed Sep. 27, 2007.

BACKGROUND OF THE INVENTION

1. Field of the Invention

The present invention relates to electrical energy storage devices, such as electrochemical cells and capacitors. More particularly, the present invention relates to a casing member, such as a lid or cover, for the casing of an electrical energy storage device. Still more particularly, the invention relates to a casing member, such as a lid, for electrical energy storage device casings having at least one opening made by a fine blanking technique.

2. Description of Related Art

Electrochemical cells and capacitors typically include a container with an opening that is closed by a lid or cover to form a casing for the electrical energy storage device. Inside the container is an anode/cathode electrode assembly activated by an electrolyte. The container and the lid are of electrically conductive material and serve as a contact for either the anode or the cathode. In a case negative cell, the anode current collector is in contact with the casing while for a case positive design, the opposite is true. The other of the anode and the cathode not in contact with the casing is connected to a terminal lead or pin electrically insulated from the casing by a glass-to-metal seal. When a load is connected between the casing and the terminal pin of an electrochemical cell, a chemical reaction produces a voltage differential that generates an electrical current to power the load, for example, a medical device.

The lid must provide access to the interior of the casing for at least two purposes. First, the terminal pin connected to the anode current collector or the cathode current collector must pass through one of the lid openings to a position exterior of the casing. Second, the electrolyte must be filled into the housing through the other lid opening. Conventionally, two openings are defined in the lid for these purposes. The openings usually have structures connected to the lid to aid in sealing them. For example, a terminal lead ferrule is attached to the lid to accommodate the terminal pin and a fillport/closure assembly is used for sealing the fill opening.

FIG. 1 is a perspective view of a prior art electrochemical cell 10 including a terminal pin 12 sealed to the cell lid 14 by a glass-to-metal seal (GTMS) 16. FIG. 1A is a cross-sectional view taken along line 1A-1A of the ferrule 18, GTMS 16, and terminal pin 12 of the cell 10. The ferrule 18 is typically comprised of a cylindrical tube 20 that is welded to the lid 14 of the battery casing 22. The terminal pin 12 of the cell 10 (or a capacitor) passes through the center of the tube 20. A ceramic or glass is fused within the annular space formed by the inner wall of the tube 20 and the terminal pin 12, thereby forming the GTMS 16.

The depth 24 of the GTMS must be sufficiently long to withstand mechanical, thermal and environmental conditions that the cell 10 is subjected to over its life. In the prior art cell 10, the lid 14 is not thick enough to house the seal by itself. Hence, the use of a ferrule 18 extending past the bottom surface 26 of the lid 14 is required to reliably seal the terminal pin 12 in the GTMS 16.

Another example of a prior art electrochemical cell that includes a terminal ferrule extending below the bottom surface of the lid is described in U.S. Pat. No. 6,010,803 to Heller, Jr. et al. This lid is formed by a metal injection molding process which requires that the intersections between the terminal lead ferrule and the main body of the lid and between the fillport structure and the lid be slightly curved or "radiused." Heller, Jr. et al. believes that radiused junctions facilitate the flow of material during the metal injection molding process. This eliminates areas of stress concentration that can cause the molded material to crack.

A casing member such as a lid formed by fine blanking according to the present invention has a higher density and, consequently, less porosity than a metal injection molded lid. Metal injection molded materials, as exemplified by Heller, Jr. et al.'s lid, require a binder. Even though technology advances have reduced the amount of binder required, metal density is still about 98% to about 98.5%, after curing. In contrast, a one piece lid according to the present invention made by fine blanking has a density of about 99.99%, and maintains acceptable mechanical properties required for glassing the terminal pin in the glass-to-metal seal. The comparatively decreased porosity of a metal injection molded lid can lead to fracturing during the glassing process and during use, which could lead to loss of hermiticity.

Another prior art lid or cover for an electrical energy storage device is described in U.S. Pat. No. 6,986,796 to Warchocki et al. This patent is assigned to the assignee of the present invention and incorporated herein by reference. Warchocki et al. describe a unitary device lid including a terminal ferrule and a fillport structure formed from a single blank of conductive material. The lid fabrication process of Warchocki et al. eliminates the need for welding a sleeve-shaped terminal pin ferrule and fillport to the lid. However, the lid of Warchocki et al. requires a relatively thick starting blank of metal, and then further requires extensive machining of the blank to provide the raised cylindrical structures for the terminal lead ferrule and the fillport structure. This machining process is time consuming, and thus expensive on a per-piece basis.

What is needed, therefore, is a casing member, such as a lid for an electrical energy storage device, that can be quickly fabricated with a minimum number of process steps, and that is optimal for subsequent formation of a terminal pin seal and a fillport seal. The lid must also be of a material having sufficient density to maintain hermiticity throughout the useful life of the electrical energy storage device.

SUMMARY OF THE INVENTION

The present invention meets these needs by providing a casing member such as a unitary lid that is securable to the open end of a container to provide a casing for an electrical energy storage device. The lid includes a flat region having spaced apart upper and lower planar surfaces joined by a peripheral edge, an angled transition forming at least one boss protruding from the lower surface, and a bore extending through the boss to the upper surface. The bore provides an opening for a terminal pin from an electrode of the device to pass there through.

The lid is preferably made by a fine blanking process that provides the boss surrounding the one opening therein. No machining of the lid is required. Moreover, the thickened boss is provided only in the immediate area surrounding the bore. The remaining majority of the lid, i.e. the flat region, is of a relatively thin wall. This thin lid wall enables a reduced overall device volume, or a greater energy density, in the same volume that would be occupied if the entire lid were of the thickness of the region proximate to the opening.

The foregoing and additional objects, advantages and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which:

FIG. 2 is a plan view of a unitary lid of the present invention;

FIG. 3 is a cross-sectional view taken along line 3-3 of FIG. 2;

FIG. 4 is a bottom view of the unitary lid of FIG. 2;

FIGS. 8 to 15 are a series of schematic cross-sectional views of a fine blanking die assembly that forms a lid according to the present invention with an angled transition, thickened boss, and extended bore for supporting a terminal pin in a glass-to-metal-seal in the lid.

Figure 1:
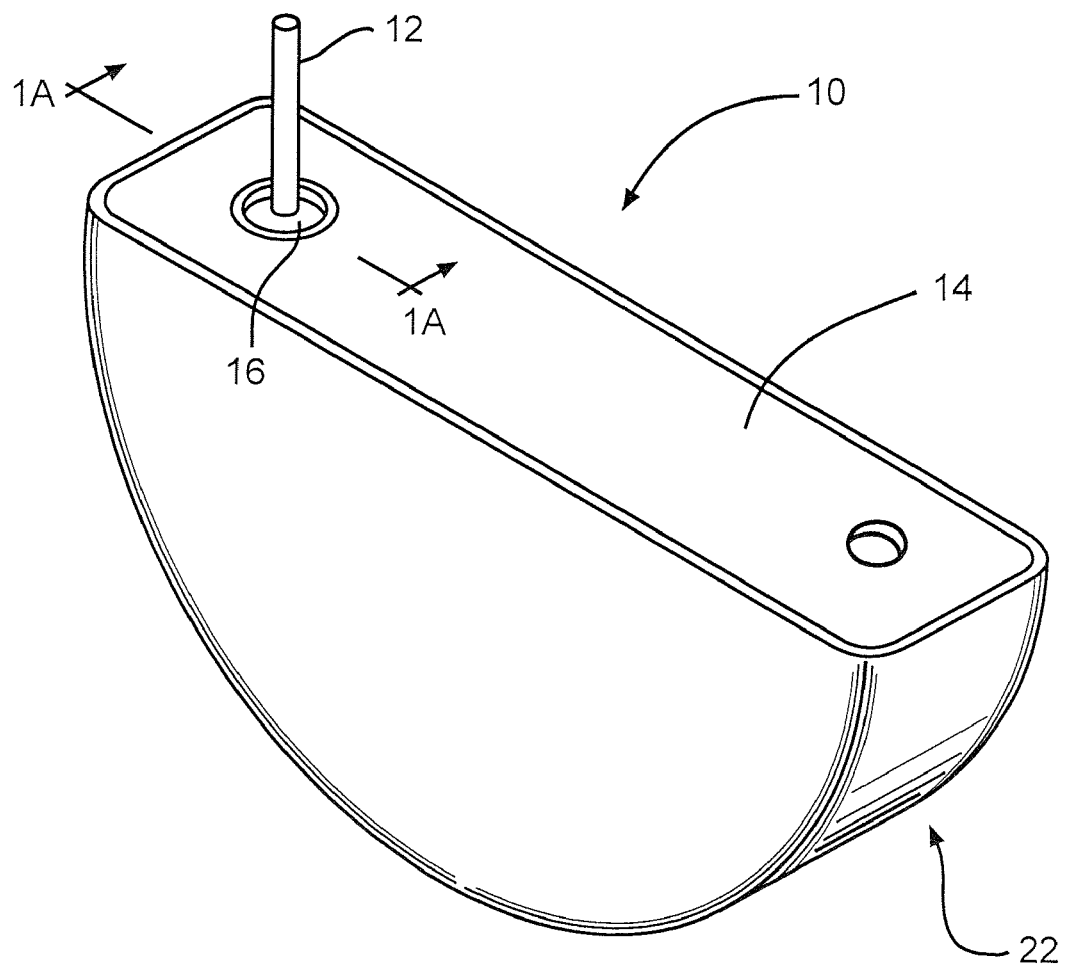
FIG. 1 is a perspective view of a prior art electrochemical cell including a terminal pin sealed to the cell lid by a glass-to-metal seal.
Figure 1A:
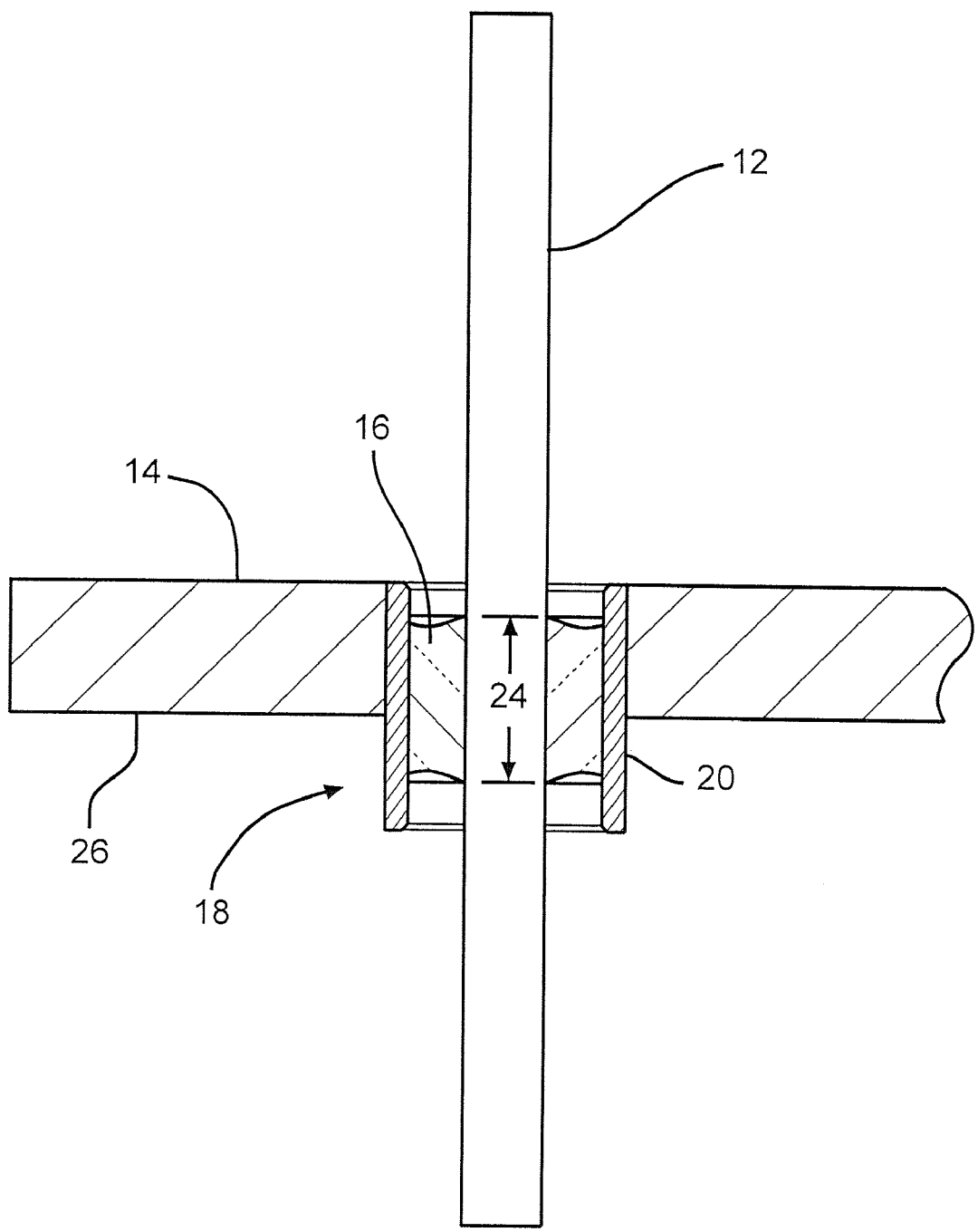
FIG. 1A is a cross-sectional view taken along line 1A-1A of FIG. 1.
Figure 3A:
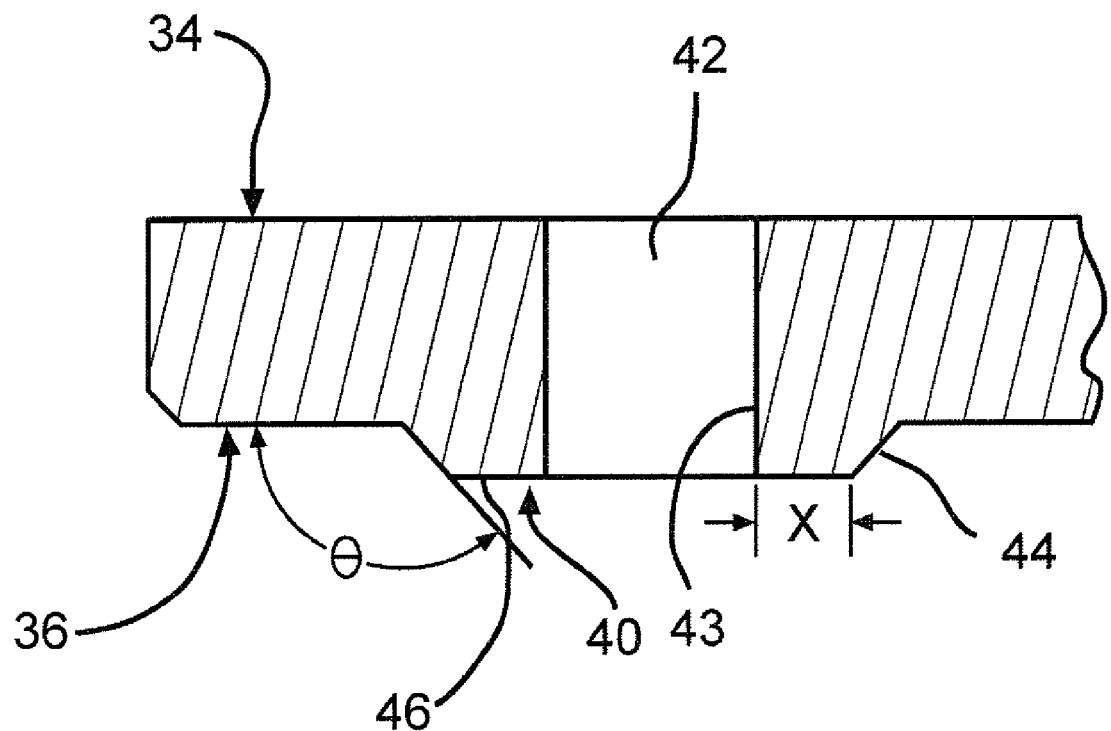
FIG. 3A is an enlarged view of the indicated portion of FIG. 3.

The present invention will be described in connection with a preferred embodiments, however, it will be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

As described herein, the terms "lid" and "cover" are used interchangeably to refer to the casing member 30 shown in FIGS. 2 to 7 that is attached to the open end of a container or housing to form a casing for an electrical energy storage device.

Electrochemical cells or batteries generate electrical current from chemical energy. Capacitors are used to store relatively large quantities of electrical energy for subsequent discharge. Often, these types of electrical energy storage devices are used in medical devices such as heart pacemakers, cardiac defibrillators, neurostimulators, cochlear implants, and the like. In that light, the lid of the present invention is a unitary casing member with a thickened boss provided in the immediate area surrounding at least the terminal pin bore. The remainder of the lid is a flat region forming a relatively thin wall. As will be described hereinafter, this makes the lid particularly applicable for electrical energy storage devices intended for incorporation into implantable medical devices.

Turning now to the drawings, FIGS. 2 to 4 show respective top, cross-sectional side elevation, and bottom views of a casing member comprising a unitary lid or cover 30 according to the present invention. The lid 30 is preferably formed by fine blanking of an electrically conductive material such as stainless steel, titanium, nickel, aluminum, and the like. The major portion of the lid 30 is a flat region 32 having spaced apart upper and lower planar surfaces 34 and 36 joined by a peripheral edge 38.

A thickened boss 40 is provided in lid 30 in the immediate area surrounding a bore 42 for either a terminal pin and glass-to-metal-seal or a fillport, preferably the former. The boss 40 includes a transition 44 that begins in the flat region 32 of the lid 30. The transition angles downwardly and inwardly toward the bore 42 at an angle theta (e) of about 90° to 160° with respect to the planar lower surface 36 toward bore 42. The angled transition 44 may continue to the perimeter 43 of the bore 42 where the maximum thickness of boss 40 occurs. However, in the preferred embodiment shown in FIGS. 3, 3A and 4, the angled transition 44 terminates at a planar shoulder 46 that completely surrounds the bore 42. The shoulder 46 has a width "x" measured from the end of the angles transition 44 to the bore 42 that is from about one-half to five times the thickness of the lid casing member 30. The lid 30 preferably has a thickness of from about 0.020 inches to about 0.050 inches measured from the upper to the lower planar lid surfaces 34, 36.

Figure 7:
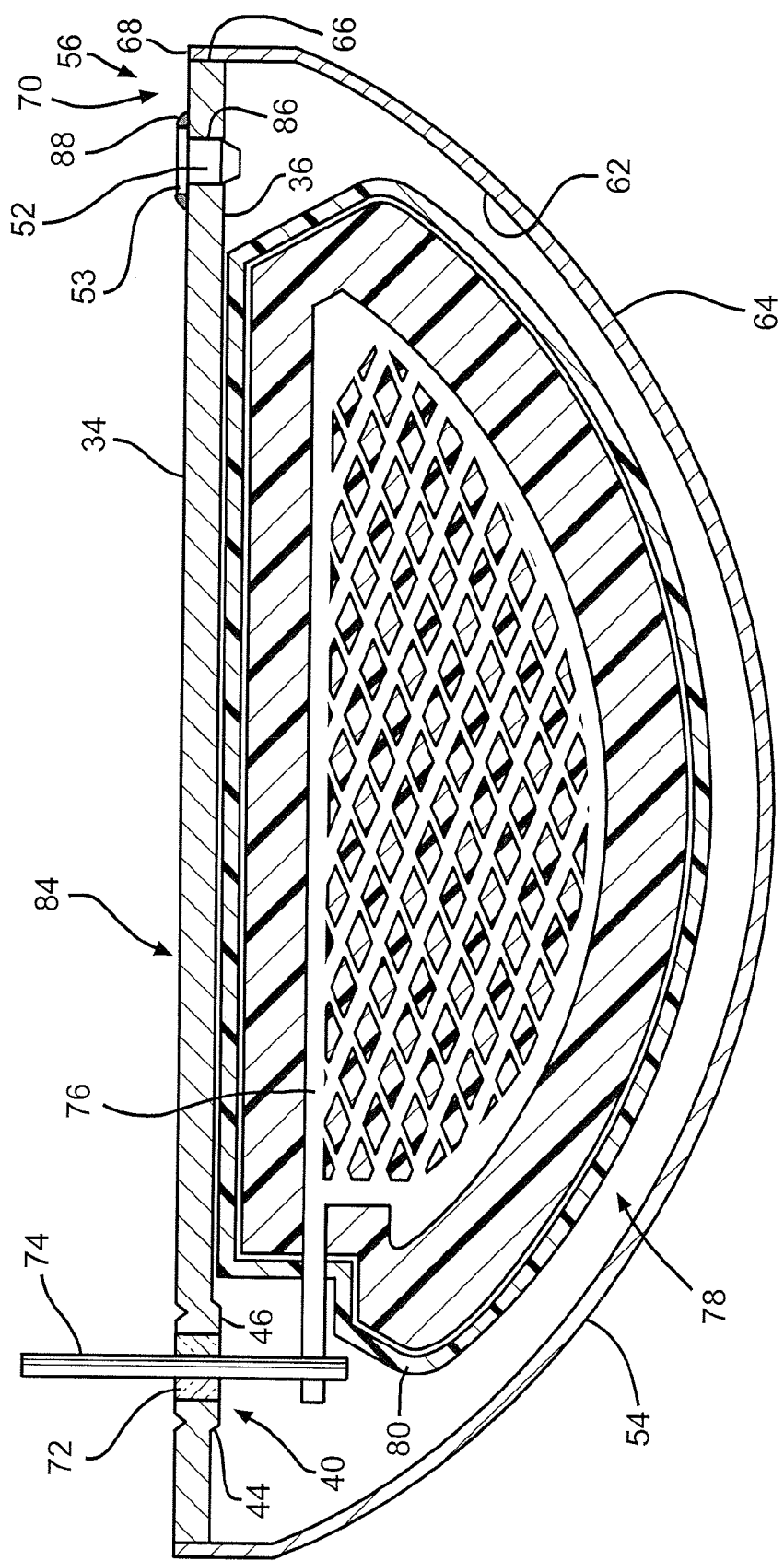
FIG. 7 is a cross-sectional side elevation view of the exemplary cell, with an alternative lid of the present invention including a fillport plug welded to a flush fillport opening.
Figure 8:
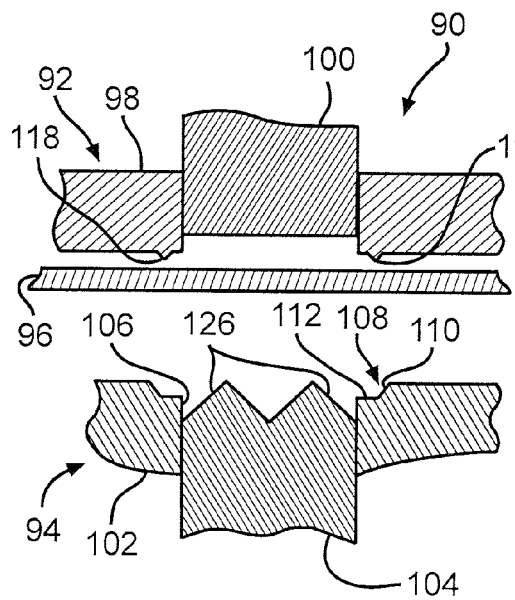

Lid 30 is further comprised of a fillport 48 in the flat region 32. The fillport 48 may be a cylindrical bore extending from the upper planar surface 34 to the lower planar surface 36 of the flat region 32. In the embodiment depicted in FIGS. 2 to 4, the fillport 48 may include a recess 50 dimensioned to receive the head of a plug 52 (FIG. 5) that is fitted therein after filling the energy storage device 60 with electrolyte. Although a cylindrical recess is shown in the drawings, other shapes such as a tapered (countersunk) recess may be suitable, depending upon the geometry of the plug head. In an alternate embodiment, at least a portion of the fill plug 52 resides on top of the lid 30 (FIG. 7).

Fillport 48 may also be provided with a thickened boss similar to the boss 40. In that manner, the depth of the recess 50 may be increased, thereby providing an extended surface for engagement with the plug 52 fitted therein.

The angled transition 44, thickened boss 40 and bore 42 are completely integral or unitary with the flat region 32 of the lid 30. As used herein, completely integral means being of a single continuous body of material. In other words, by forming the lid 30 from a blank of flat sheet stock, the angled transition 44 and thickened boss 40 are not separate or discrete parts, but rather are completely unitary with the flat region 32 forming a single part. The bore 42 is preferably cylindrical in shape.

Lid 30 terminates along the peripheral edge 38 which is generally perpendicular to the upper and lower planar lid surfaces 34, 36. In the embodiment shown, the flat region 32 is generally rectangular in peripheral shape. When in place closing the open end of the container 54, the upper planar surface 34 is an exterior surface and the lower planar surface 36 is an interior surface of a casing 56 (FIG. 3).

Although the thickened boss 40 is shown protruding outwardly from the lower planar surface 36 and the opposed portion of the thickened boss 40 is coplanar with the upper planar surface 34, the present invention should not be so limited. Instead, the thickened boss 40 may protrude outwardly from the upper lid surface 34. What is important is that the thickened boss 40 is unitary with the flat region 32, and extends outwardly from at least one of the upper or lower planar surfaces 34, 36 to provide an elongated length of bore 42. In that manner, a greater amount of surface area is provided for bonding of a glass-to-metal seal therein.

It will be understood by those of ordinary skill in the art that the flat region 32 of the lid 30 may be of any suitable shape to mate with and close an opening in a container 54 for a casing 56, which also may be of any suitable shape. Therefore, the present invention contemplates any configuration of two portions of an electrical energy storage device casing which when mated form a housing therein. This includes casings of a cylindrical shape, prismatic shape, or button shape, and a casing formed of mating portions, such as described in U.S. Pat. No. 6,613,474 to Frustaci et al. This patent is assigned to the assignee of the present invention and incorporated herein by reference.

In particular, the Frustaci et al. patent describes a casing comprising a first casing member having a first surrounding sidewall extending to and meeting with a continuous first major facewall mated to a second casing member having a second surrounding sidewall extending to and meeting with a continuous second major facewall. In the mated relationship, a first outer edge of the first surrounding sidewall faces the second major facewall and a second outer edge of the second surrounding sidewall faces the first major facewall with at least a portion of the first surrounding sidewall in an overlapping, direct contact relationship with at least a portion of the second surrounding sidewall to form a seam for sealing the first and second casing members together, thereby enabling the casing to house an anode, a cathode and an activating electrolyte contained therein. According to the present invention, one of the first and second casing members comprises a flat region having spaced apart upper and lower planar surfaces, a transition forming a boss protruding from either the upper or the lower planar surface, and a bore extending through the boss to the other surface thereof. A terminal pin is connected to one of the anode and the cathode and extending through the bore to a position spaced above the flat region of the one casing member. A glass hermetically seals the terminal pin in the bore in an insulated relationship with respect to the casing.

Either one of the lid or the container, or the mating portions may include the angled transition 44 and thickened boss 40 and be formed as a single, unitary part. What is important is that the thickened boss 40 is provided only in the immediate area surrounding the bore 42. The remaining majority of the casing nearby is of a relatively thin wall. This means that as little internal casing volume as possible is occupied by the unitary lid 30. Such a construction benefits volumetric cell efficiency, which is especially important in electrical energy storage devices intended for incorporation in implantable medical devices.

Figure 5:
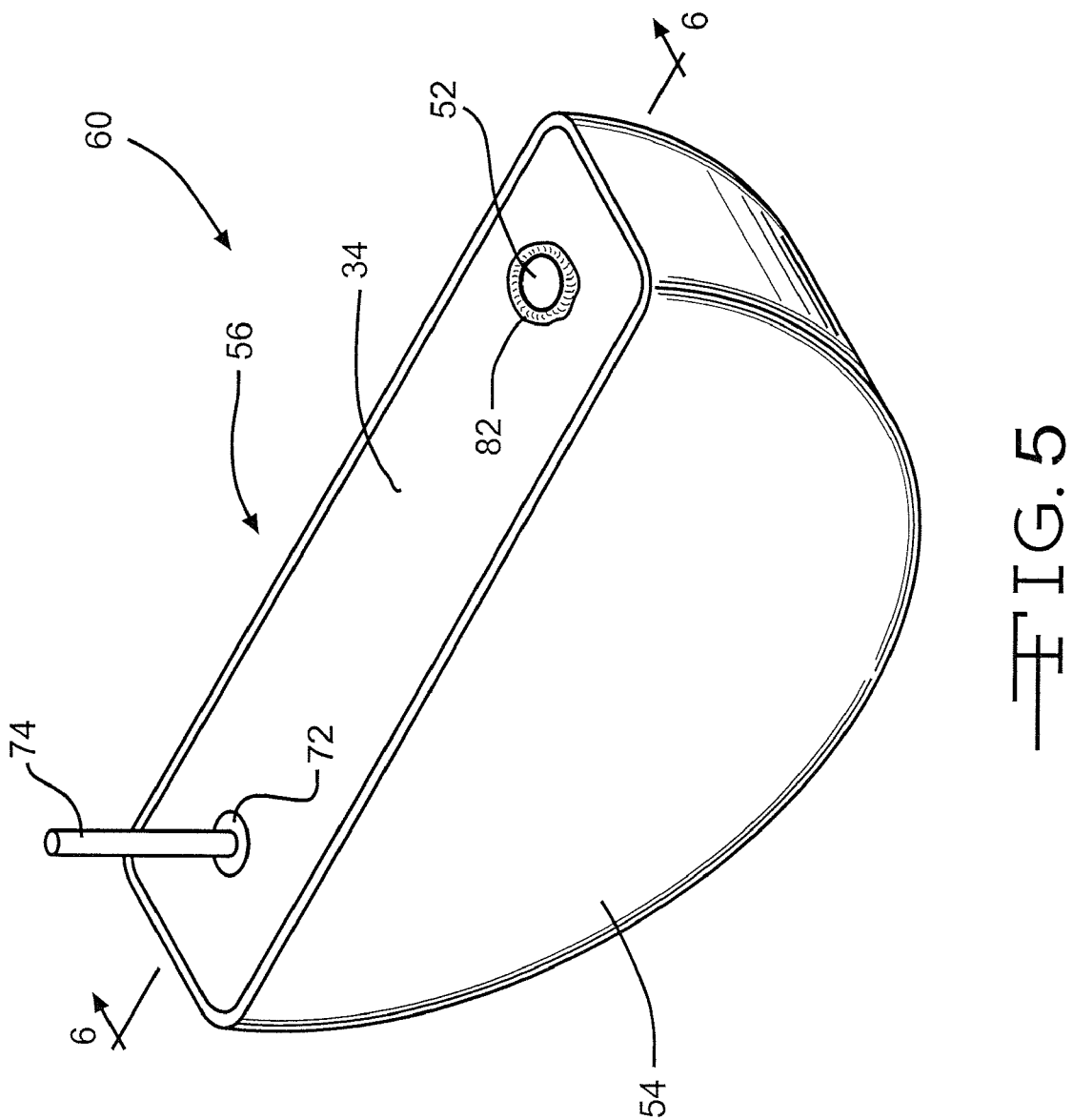
FIG. 5 is a perspective view of an exemplary electrochemical cell with the unitary lid of the present invention attached to a container to provide a casing for the electrode assembly.
Figure 6:
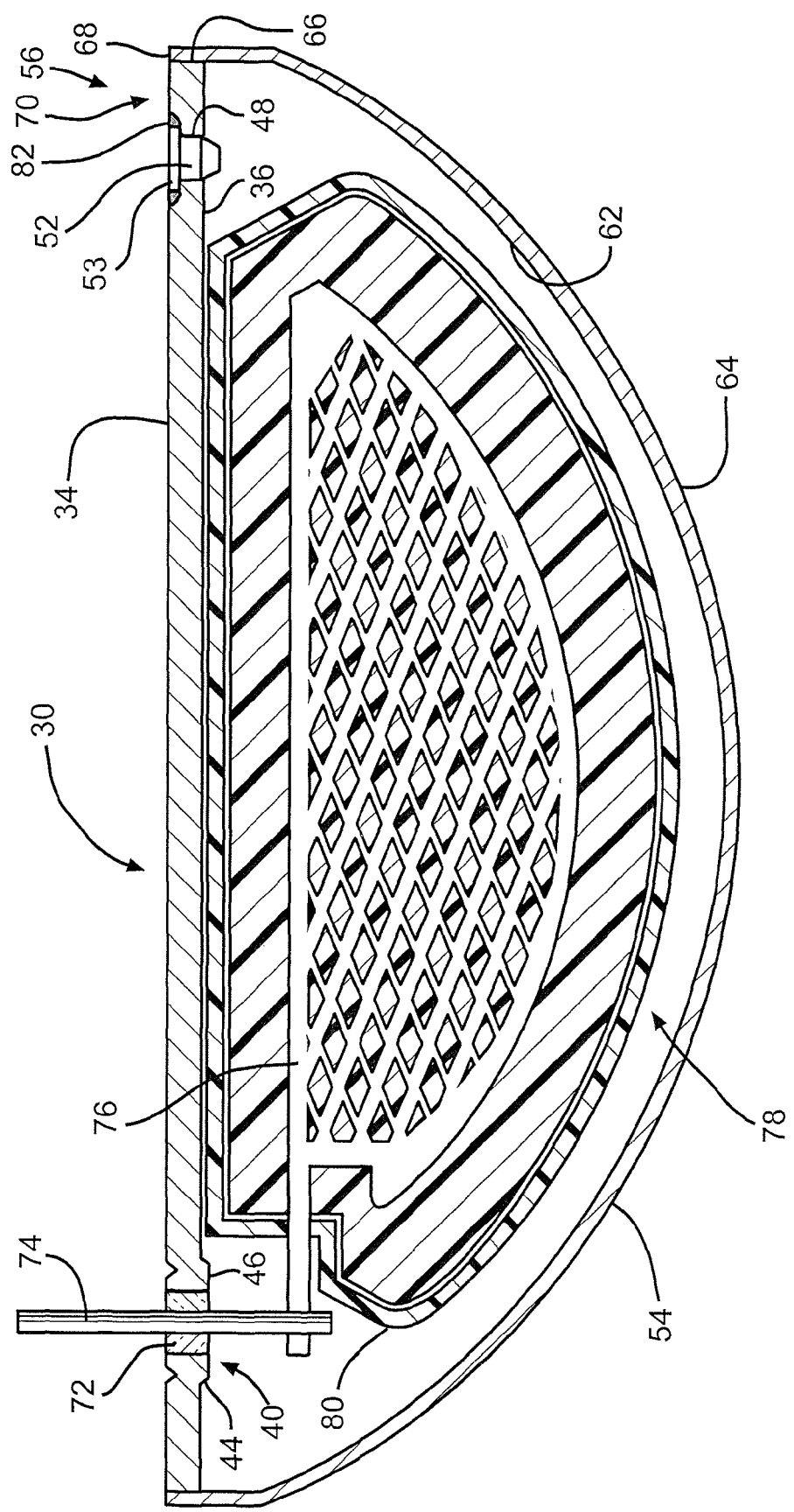
FIG. 6 is a cross-sectional view taken along line 6-6 of FIG. 5.

FIGS. 5 and 6 show an illustrative exemplary electrochemical cell 60 incorporating a lid or cover 30 according to the present invention. The exemplary cell 60 is similar to that described in U.S. Pat. No. 5,750,286 to Paulot et al., which is assigned to the assignee of the present invention and incorporated herein by reference. The cell 60 includes the casing 56 made of metal, such as stainless steel, titanium, nickel, aluminum, or other suitable electrically conductive materials. Casing 56 is formed of two portions: the container shell 54 and the lid 30. Container 54 has a surrounding sidewall including an interior surface 62 and an opposite exterior surface 64. Further, container 54 terminates in a peripheral region 66 forming an edge or rim 68. Peripheral region 66 defines an opening 70 leading into the container 54. Accordingly, the container 54 forms generally all but one open side of casing 56. Lid 30 closes opening 70 and is attached to the peripheral region 66, such as by welding.

The thickened boss 40 supports a glass-to-metal seal 72 for a terminal pin 74 connected to the current collector 76 of one of the electrodes, for example the cathode 78. The anode (not shown) is segregated from the cathode by a separator 80. The anode/cathode electrode assembly is then activated by an electrolyte (not shown) filled in the casing 56 and sealed therein by a closure means, such as plug 52 press-fit into the fillport 48. In the embodiment depicted in FIGS. 3 and 6, the fillport 48 includes the recess 50 dimensioned to receive the head 53 of the plug 52. The outer perimeter of the plug head 53 is preferably joined to the lid 30 by weld 82, thereby ensuring a hermetic seal of the plug 52 to the lid 30.

FIG. 7 is a cross-sectional side elevation view of another exemplary cell, with an alternative lid embodiment of the present invention. Lid 84 is provided without a recess in the fillport 86. Instead, the fillport 86 is formed as a continuous straight bore extending from the upper surface 34 to the lower surface 36 of the lid 84. The head 53 of plug 52 is thus seated on and protrudes above the upper lid surface 34. The outer perimeter of the plug head 53 is joined to the lid 30 by weld 88. Those skilled in the art will understand that the present invention is not limited to any particular closure structure.

In accordance with the previous description, it will be evident that the present invention is applicable to any type of electrical energy storage device comprising a housing having a container portion with an open side and a cover for closing the container, thereby forming a casing for the storage device. In that respect, the present lid is applicable to low rate, medium rate, high rate, case negative and case positive capacitors and electrochemical cells, the latter of both primary and secondary chemistries. An exemplary capacitor is of an electrolytic type having a tantalum anode and a ruthenium oxide cathode. Exemplary electrochemical cells include lithium iodine cells, lithium thionychloride cells, lithium silver vanadium oxide cells, lithium carbon monofluoride cells, lithium manganese dioxide cells, and secondary cells containing lithium cobalt oxide cathodes, and the like.

It will further be recognized that such cells may take one of various configurations. For example, depending on the type of cell, the configuration of the anodes, cathodes, terminal lead ferrule portions, fillports, etc. will vary. Also, for example, depending on the cell, the materials housed in the casing will vary and the anode, cathode and electrolyte may be either liquid or solid. Therefore, it should be clear that the present invention is in no manner limited to the illustrative electrical energy storage devices described herein and is applicable to all types of power source chemistries.

The present invention is also applicable to capacitors, such as those described in U.S. Pat. Nos. 5,926,362 and 6,334,879, both to Muffoletto et al. These patents are assigned to the assignee of the present invention and incorporated herein by reference.

The lid casing member 30 of the present invention is preferably formed by fine blanking of an electrically conductive material such as stainless steel, titanium, nickel, aluminum, and the like. FIGS. 8 to 15 are a series of schematic cross-sectional views of a fine blanking die assembly 90 that forms the lid 30. The die assembly 90 includes an upper portion 92 and a lower portion 94 between which a blank 96 of the electrically conductive material having a density of about 99.99% is disposed at the beginning of the forming process. In these drawings, only the portion of assembly 90 that forms the angled transition 44, thickened boss 40 and extended bore 42 in the lid 30 are shown. The die assembly 90 is further comprised of other regions which cut and form the peripheral edge 38 and fillport 48 of the lid 30.

The upper portion 92 of the die assembly 90 is comprised of an upper plate 98 and a punch 100. The lower portion 94 of the die assembly 90 is comprised of a lower plate 102 and a counter-punch 104 disposed in a hole 106 in the lower plate 102. The lower plate 102 is provided with a recess 108 adjacent to the perimeter of the hole 106. Although not necessary, the recess 108 preferably completely surrounds the hole 106 perimeter. The recess 108 includes a bevel 110 and a flat shoulder 112. As will be seen presently, the recess 108 receives metal that is displaced in the blank 96 during the fine blanking process to form the angled transition 44 and the flat shoulder 46 of the thickened boss 40 (FIG. 3).

Figure 9:
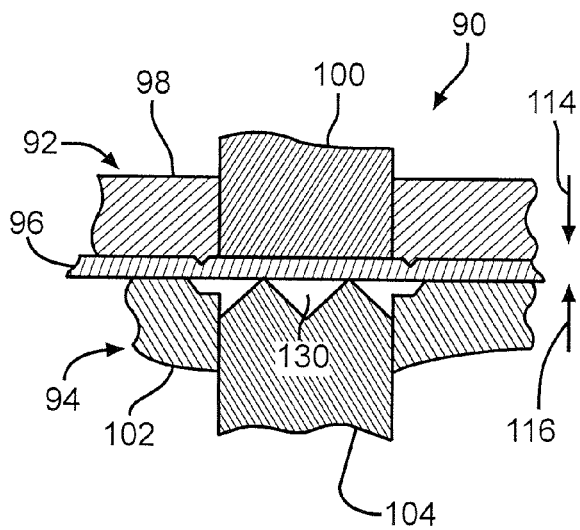

Referring to FIG. 9, to begin the fine blanking process, the upper portion 92 and the lower portion 94 of the die assembly 90 are brought together as indicated by respective arrows 114 and 116 to firmly clamp the blank there between. The upper plate 98 and/or lower plate 102 may be provided with a sharp edge V-ring 118 that "bites" into the blank 96. In that manner, any lateral movement or creep of the blank 96 between the upper and lower plates 98, 102 during the subsequent forming process steps is prevented. It is noted that the relative amount that the V-ring 118 protrudes downwardly from the upper plate 98 may be less than that depicted. The relative size of the V-ring 118 has been exaggerated for clarity of illustration.

Figure 10:
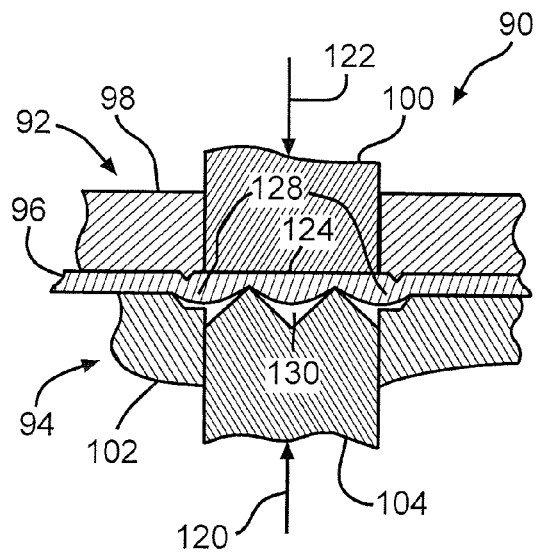

Referring to FIG. 10, the counter-punch 104 is forced upwardly as indicated by arrow 120. A counter force is applied to punch 100 as indicated by arrow 122 to prevent any upward displacement of the central portion 124 of the blank 96 that is disposed between the counter-punch 104 and the punch 100. In that manner, as the counter-punch 104 is moved upwardly, the angled outer surface 126 (FIG. 8) of the counter-punch 104 deforms the central portion 124 of the blank 96. As this happens, the outer region 128 of the central portion 124 of the blank 96 is extruded into the recess 108 in the lower plate 102 of die assembly 90. The counter-punch 104 may also be provided with a central recess 130 (FIG. 9) to receive material displaced from the interior of the central portion 124 of the blank 96.

Figure 11:
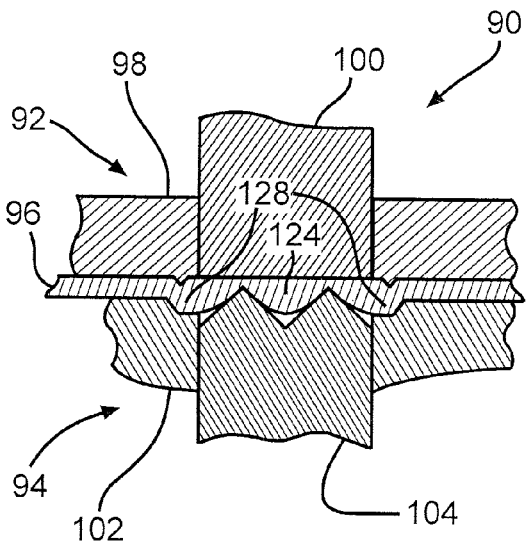

Referring to FIG. 11, the upward advancement of the counter-punch 104 into the central portion 124 of the blank 96 is now completed. The recess 108 of the lower plate 102 has been completely filled with material displaced from the outer region 128 of the central portion 124 of the blank 96, thereby forming what will be the angled transition 44 and the flat shoulder 46 of thickened boss 40 of lid 30 (FIG. 3).

Referring now to FIG. 12, the bore 42 of the lid 30 casing member is formed. Punch 100 is forced downwardly as indicated by arrow 132. Counter-punch 104 is permitted to recede downwardly as indicated by arrow 134, and thus punch 100 shears off the waste slug 136 from the blank 96 and forces it into the hole 106 in the lower plate 102. During this step, the peripheral edge 38 (not shown) and the fillport 48 (not shown) of the lid casing member 30 may also be formed. The die assembly 90 is preferably made such that the peripheral edge 38, the fillport 48 and the bore 42 of the lid 30 can be formed in this single step.

Referring to FIG. 13, the upper portion 92 and the lower portion 94 of the die assembly 90 are separated from each other as indicated by the respective arrows 138 and 140. The punch 100 is also withdrawn into the upper plate 98 as indicated by arrow 142. The lid casing member 30, which now includes the thickened boss 40 comprised of the angled transition 44 and the flat shoulder 46, is then released from the die assembly 90. Referring to FIG. 14, the counter-punch 104 is moved upwardly as indicated by arrow 144, displacing the waste slug 136 out of the hole 106 in the lower plate 102. The finished lid casing member 30 is finally removed from the die assembly 90 as indicated by arrow 146.

Referring to FIG. 15, the waste slug 136 is removed from the die assembly by a jet of air or other suitable conveying means as indicated by arrow 147. The counter-punch 104 is withdrawn into the hole 106 of the lower plate 102 as indicated by arrow 148. A new blank 97 is moved into position between the upper and lower portions 92, 94 of the die assembly 90 as indicated by arrow 150. The process for forming another lid casing member 30 as described herein and shown in FIGS. 8 to 14 may then be repeated.

EXAMPLE 1

An exemplary electrical energy storage device lid of the present invention may be prepared by fine blanking according to the following description. A blank of titanium sheet 0.048 inches thick may be provided as a starting material. A lid may be stamped from the titanium sheet with a width of about 0.40 inches and a length of about 0.68 inches. The thickened boss of the lid may be formed with a die assembly as shown in FIGS. 8 to 15 and described herein.

Referring to FIG. 3, the thickened boss 40 of the lid casing member 30 may be about 0.058 inches thick, with a flat shoulder 46 about 0.100 inches in diameter. The angled transition 44 to the flat shoulder 46 of the lid 30 may be formed at about a 135° angle with respect to the flat shoulder 46. The bore 42 through the thickened boss 40 may be formed at about 0.050 inches in diameter for receiving a glass-to-metal seal 16 and terminal pin 12 (FIG. 1) passing there through.

It is, therefore, apparent that there has been provided, in accordance with the present invention, an improved lid for closing an open end of a casing for an electrochemical energy storage device. While this invention has been described in conjunction with preferred embodiments thereof, it is evident that many alternatives, modifications, and variations will be apparent to those skilled in the art. Accordingly, the present invention is intended to embrace all such alternatives, modification and variations that fall within the broad scope of the appended claims.

What is claimed is:

1. An electrical energy storage device, which comprises:
   a) a container having a surrounding sidewall providing an opening leading into the container;
   b) an electrode assembly comprising an anode, a cathode and an intermediate separator disposed inside the container;
   c) a lid secured to the open end of the container to provide a casing housing the electrode assembly, the lid having:
      i) a thickness of from about 0.020 inches to about 0.050 inches extending between spaced apart upper and lower planar surfaces joined by a peripheral edge,
      ii) a transition surface forming a boss protruding from either the upper or the lower planar surface, wherein the transition surface has a frusto-conical shape extending at an angle greater than 90° to 160° from a first end of the transition surface at the one of the upper and lower planar lid surface to a second end of the transition surface connected directly to a planar shoulder, and
      iii) wherein the planar shoulder has a width of from one-half to five times the lid thickness and extends from the transition surface to an annular perimeter surface defining a bore extending through the boss to the other of the upper and lower planar surface thereof;

d) a terminal lead connected to one of the anode and the cathode and extending through the bore to a position spaced above the upper surface of the lid;

e) a glass in direct sealing contact with the terminal lead and the bore of the boss to thereby provide the terminal lead in an insulated relationship with respect to the casing; and f) an electrolyte provided in the casing to activate the anode and cathode electrodes.

2. The electrical energy storage device of claim 1 wherein the lid further includes a filiport extending from the upper surface to the lower surface thereof.

3. The electrical energy storage device of claim 1 wherein the lid is selected from the group consisting of stainless steel, titanium, nickel, and aluminum.

4. The electrical energy storage device of claim 1 wherein the lid is of a conductive material having a density of 99.99%.

5. The electrical energy storage device of claim as either an electrochemical cell or a capacitor.

6. An electrical energy storage device, which comprises:

a) a first casing member having a surrounding side all providing an opening leading therein;

b) an electrode assembly comprising an anode, a cathode and an intermediate separator disposed inside the first casing member;

c) a second casing member secured to the open end of the first casing member to provide a casing housing the electrode assembly, the second casing member having:

i) a thickness of from about 0.020 inches to about 0.050 inches extending between spaced apart upper and lower planar surfaces joined by a peripheral edge, ii) a transition surface forming a boss protruding from either the upper or the lower planar surface, wherein the transition surface has a frusto-conical shape extending at an angle greater than 90° to 160° from a first, end of the transition surface at the one of the upper and lower planar lid surface to a second end of the transition surface connected, directly to a planar shoulder, and iii) wherein the planar shoulder has a width of from one-half to five times the lid thickness and extends from the transition surface to an annular perimeter surface defining a bore extending through the boss to the other of the upper and lower planar surface thereof;

d) a terminal lead connected to one of the anode and the cathode and extending through the bore to a position spaced above the upper surface of the second casing member;

e) a glass in direct sealing contact with the terminal lead and the bore of the boss to thereby provide the terminal lead in an insulated relationship with respect to the casing; and f) an electrolyte provided in the casing to activate the anode and cathode.

7. The electrical energy storage device of claim 6 wherein the second casing member further includes a fillport extending from the upper surface to the lower surface thereof.

8. The electrical energy storage device of claim 6 wherein the second casing member is selected from the group consisting of stainless steel, titanium, nickel, and aluminum.

9. The electrical energy storage device of claim 6 wherein the second casing member is of a conductive material having a density of 99.99%.

10. The electrical energy storage device of claim 6 as either an electrochemical cell or a capacitor.

\* \* \* \* \*